Patented Dec. 23, 1941

2,267,548

UNITED STATES PATENT OFFICE 2,267,548

ART OF EXTRACTING OIL FROM THE EARTH

Ernst Berl, Pittsburgh, Pa.

No Drawing. Application January 31, 1936, Serial No. 61,804. In Great Britain February 4, 1935

4 Claims. (Cl. 166—21)

The present invention relates to the art of extracting oil from the earth.

It has been well known that, heretofore, the extraction of oil from the earth has been very incomplete. Tests have demonstrated that considerable quantities of crude oil remained in the mother rock, such as limestone, sandstone, and the like. In some instances, it has been found that about 20% to about 70% of oil remained in the rocks in the earth. The residual oil left in the earth has been considered lost for all practical purposes. Various proposals have been made to avoid the losses which have been experienced in the past. Of these proposals, mention may be made of the attempts to pump or force water down wells surrounding the oil well which has been undergoing pumping. In some cases, salt or soda has been added to the water. In a few isolated cases, some results were obtained, but in most cases the results have been unfavorable. None of the attempts, as far as I am aware, has been wholly satisfactory, particularly when carried into practice on an industrial scale.

I have discovered that the aforesaid losses of oil remaining in the mother rock can be reduced and that considerable improvements in the yields can be effected from oil wells.

It is an object of the present invention to overcome the unfavorable conditions in the exploitation and recovery of oil from the earth and to utilize an aqueous solution containing substances possessing stronger wetting properties than water for removing oil from the mother rock.

A further object of the present invention is to pump aqueous solutions containing wetting agents possessing some solubility in oil into the earth adjacent to the well to release from the mother rock residual oil locked therein.

The invention likewise contemplates the provision of a process of utilizing capillary active substances to effect the removal of imprisoned oil and of utilizing aqueous solutions of the aforesaid substances containing the so-called "polar" groups.

Other advantages and objects of the invention will become apparent from the following description.

Broadly stated, the invention comprises releasing the oil and freeing it from the surrounding rocks to enable the oil to flow together in a mass or pool from which it may be removed to the surface of the earth. It has been found that capillarity phenomena cause the adhesion of oil to the surfaces of the walls of mother rock. By utilizing a watery solution containing an organic oil soluble and water soluble wetting agent and by pumping this solution into a region containing imprisoned oil, the walls of the rock and even the capillary spaces are moistened and wetted by the wetting solutions and the bond between the oil and the mother rock is disrupted. It is believed that the wetting substance forms a film over the surface of the rock which enables the oil to form droplets and globules and to collect together in a mass. In this manner, the oil is freed from the mother rock, even the capillary spaces, and the oil can then be easily separated from the rock and removed from the interior of the earth.

In carrying the present invention into practice, I have found that aqueous solutions containing wetting substances, especially capillary-active substances, are effective to release the imprisoned oil from the mother rock and to enable the thus-released oil to run together and to be collected and removed from its native environment. As a result of extensive experiments, I have discovered that aqueous solutions containing so-called water-soluble tar acids and/or salts thereof have given satisfactory results. In addition, substances having similar constitution containing so-called "polar groups," such as OH, $NH_2$, COOH, $SO_3H$, CSSH and their combinations associated with straight chain hydrocarbons, aromatic ring compounds, etc. etc. are within the purview of the present invention. Thus, satisfactory results have been given by free fatty acids, such as oleic acid, palmitic acid, stearic acid, etc. which contain long carbon chains and/or their salts, such as oleates, palmitates, stearates, etc. which are known as soaps. Other examples of "oil-liberating agents" are phenols or aromatic amino compounds, etc., such as aniline and its homologues, amido phenols, phenol-sulfonic acids, amido sulfonic acids, alcohols with long carbon chains, alcohol sulfonates, xanthogenates and/or combinations thereof. Aqueous solutions of suitable organic dyestuffs may be advantageously used as oil-liberating agents. For instance, basic dyestuffs, such as crystal violet and methylene blue, or acid dyestuffs (in weak acid solutions, if necessary), such as "cloth" red and alizarin yellow. As further examples of "oil-liberating" agents, mention may be made of substances used in flotation. A fairly complete list of these flotation agents may be found in Taggart's Handbook of Ore Dressing (1927 edition, pages 830 to 839).

For the purpose of giving those skilled in the art a better understanding of the invention, the following illustrative examples are given.

Example No. 1

A diluted solution, say about 0.1–5%, of an alkaline salt, such, for instance, a sodium salt of the so-called tar acids may be used as the oil-liberating agent for removal of crude oil adhering to "hydrophile" rocks, such as sandstone, limestone, dolomite, etc. The so-called water-soluble tar acids may be made, for instance, according to U. S. Patent No. 1,812,316 or made by adding to water-soluble tar acids of the acid wash in petroleum refining, the alkaline wash liquids from the purification of crude oil fractions. For the same purpose, water solutions of free tar acids or/and their acid salts, may also be used, especially in the case of acid rock like sandstone. In this manner, a substantially complete removal of the oil, even in the fine capillaries, may be effected.

In contrast to the foregoing, if water is used in accordance with prior art teachings in place of the aqueous solutions mentioned herein, it has been observed that an emulsion of the oil with water formed and that an incomplete removal of the oil occurs.

In applying my solutions of oil-liberating agents, it is preferred to pump an aqueous solution containing the same into the earth surrounding the oil well through one or more pipes. For instance, it is preferred to use four pipes surrounding the oil well, preferably in the form of a quadrangle.

Example No. 2

Aqueous solutions of mineral coal, brown coal or wood tar phenols or phenolates have been used as oil-liberating agents as in Example No. 1 with satisfactory results. With these agents, it has been noticed that a quick, practical and substantially complete liberation of the oil is effected in the mother rock and that the removal of the liberated oil may be effected.

Example No. 3

Aqueous solutions of aniline at ordinary or increased temperature have been used to great advantage for the liberation and removal of oil.

Example No. 4

Aqueous solution of alkaline salts of ethyl or amyl xanthogenates or alkaline salts of higher alcohol sulfonates or of benzol sulfonic acids or their homologues or amino phenols or aromatic amino sulfonic acids or/and the corresponding free compounds may be used for the purpose of liberating and removing oil. One may also use for the same purpose aqueous solutions of amido phenols and amino phenolates, amido carbonic acids or/and their salts and mixtures of the substances mentioned in this example or in the foregoing examples. Excellent results have been obtained by their use.

Example No. 5

A diluted aqueous solution of methyl violet or methylene blue has been found to give satisfactory results for the liberation and removal of oil.

Example No. 6

Satisfactory results have been obtained by the use of solutions of acid organic dyestuffs, such as "cloth" red or alizarin orange.

Although the present invention has been described in conjunction with certain preferred embodiments it is to be understood that variations and modifications may be resorted to without departing from the spirit and scope of the invention as described herein and defined in the appended claims. Thus, substances which contain the so-called carbophile and hydrophile groups or constituents may be used. In addition to those mentioned hereinbefore, substances containing the following groups may be included: =NH, =S, —SH, CSN—, and CSNH. For best results, sodium salts of water-soluble acid tars and alcohol sulfonates are preferred. Certain advantages may be obtained in using such substances which will give soluble calcium salts because the greatest part of mother rocks which contain oil are formed of limestone or dolomite. When aqueous solutions of a substance which produces an insoluble calcium salt are used, capillaries and fine fissures tend to become clogged and certain difficulties toward the liberation and free flow of oil are encountered.

I claim:

1. The process of extracting oil from the earth in regions adjacent to mother rocks, which comprises introducing into such regions a water solution having no substantial destructive effect upon said mother rocks and comprising an organic oil soluble and water soluble substance containing a polar group and free from sulfonic acid groups in the molecule.

2. The process of extracting oil from the earth in regions adjacent to mother rocks which comprises introducing into said regions an oil-freeing agent comprising a water solution of an aromatic compound of the group consisting of aniline, amino phenols, amino phenolates, phenols, and amino carbonic acids.

3. The process of extracting oil from the earth in regions adjacent to mother rocks which comprises introducing into said regions an oil-freeing agent comprising a water solution of an aromatic dyestuff of the group consisting of basic and acid of benzene, naphthalene, anthracene and thioanthracene compounds.

4. The process of extracting oil from the earth in regions adjacent to mother rocks which comprises introducing into said regions an oil-freeing agent comprising a water solution of a salt of a thiocarboxylic acid having not more than six carbon atoms.

ERNST BERL.